United States Patent [19]
Lawrie

[11] Patent Number: 5,948,472
[45] Date of Patent: Sep. 7, 1999

[54] METHOD FOR MAKING A PULTRUDED PRODUCT

[75] Inventor: Duncan J. Lawrie, Millcreek Township, Pa.

[73] Assignee: Lawrie Technology, Inc., Girard, Pa.

[21] Appl. No.: 08/711,288

[22] Filed: Sep. 10, 1996

[51] Int. Cl.[6] ....................................................... B05D 3/12
[52] U.S. Cl. .......................... 427/289; 156/180; 280/610; 427/358; 427/434.2; 428/34.1
[58] Field of Search ........................... 156/180; 280/610; 427/289, 358, 434.2; 428/34.1

[56] References Cited

U.S. PATENT DOCUMENTS

| | | |
|---|---|---|
| 3,132,874 | 5/1964 | Baudou . |
| 3,201,138 | 8/1965 | Brown, Jr. . |
| 3,372,943 | 3/1968 | Grossauer . |
| 3,771,805 | 11/1973 | Ishida . |
| 3,902,731 | 9/1975 | Fagen et al. . |
| 3,933,362 | 1/1976 | Sakuma et al. . |
| 3,940,157 | 2/1976 | Sakuma . |
| 3,980,744 | 9/1976 | Cogswell . |
| 4,035,000 | 7/1977 | Lacroix . |
| 4,071,264 | 1/1978 | Legrand et al. . |
| 4,634,563 | 1/1987 | Hancock . |
| 4,667,977 | 5/1987 | Lacroix . |
| 4,804,200 | 2/1989 | Kuchler . |
| 5,024,866 | 6/1991 | Goode . |
| 5,026,447 | 6/1991 | O'Connor . |
| 5,114,516 | 5/1992 | Pilling et al. . |
| 5,174,844 | 12/1992 | Tong ........................................ 156/180 |
| 5,176,865 | 1/1993 | Beall et al. ........................... 156/180 X |
| 5,217,243 | 6/1993 | Recher et al. . |
| 5,249,819 | 10/1993 | Mayr . |
| 5,265,911 | 11/1993 | Goode . |
| 5,288,097 | 2/1994 | Pascal et al. . |
| 5,294,139 | 3/1994 | Cazaillon et al. . |
| 5,294,151 | 3/1994 | Goode . |
| 5,299,822 | 4/1994 | Mayr et al. . |
| 5,324,377 | 6/1994 | Davies . |
| 5,366,773 | 11/1994 | Schroll et al. . |
| 5,372,370 | 12/1994 | Rohrmoser . |
| 5,374,385 | 12/1994 | Binse et al. . |
| 5,556,496 | 9/1996 | Sumerak ............................. 156/180 X |

*Primary Examiner*—Michael Lusignan
*Attorney, Agent, or Firm*—Webb Ziesenheim Logsdon Orkin & Hanson, P.C.

[57] ABSTRACT

A torsion box, useful for skis, snowboards or the like, has a constant cross section and a hollow interior. The torsion box is made from a plurality of plies and a resin matrix, at least some of the plies consisting of fibers disposed at an angle with respect to a longitudinal axis of the torsion box. The plies include fibers preferably selected from the group consisting of glass, carbon and Kevlar®. Particularly, the fibers will be angled with respect to the longitudinal axis of the torsion box within a range of about 0° to about 45°. The torsion box may be made by a pultrusion process where the desired fibers are pulled through a resin bath, or injected with resin, and heated in a die, then cut to a desired length. The plies are arranged to impart a material imbalance to the torsion box so that, upon cooldown, the product exhibits a predetermined camber. When applied to skis, the torsion box and process according to the invention allow for ski manufacturing in a continuous, rather than batch, process.

3 Claims, 6 Drawing Sheets

E-GLASS / EPOXY

METHOD FOR MAKING A PULTRUDED PRODUCT

BACKGROUND OF THE INVENTION

1. Field of the Invention

This invention is related to skis, snowboards and the like and, more particularly, an improved ski design, as well as an improved, more versatile and efficient method for making skis.

2. Description of the Prior Art

Current designs for skis, snowboards and similar products, particularly Alpine snow skis, require a batch (non-continuous) manufacturing process. Performance criteria for skis have led to a general practice whereby each ski has only one axis of geometric symmetry (for example, symmetry along the longitudinal axis of the ski). The properties required for acceptable ski performance have dictated the parameters of conventional ski design and have determined how a ski can be manufactured.

For instance, a ski must distribute the skier's weight along its length. Therefore, a lengthwise curvature or "camber" is conventionally built into the skis such that applied body weight flattens the ski and ensures that a moderate pressure load is applied at the tip of the ski and the tail of the ski, in the downward direction normal to the surface on which the ski is placed.

Proper ski performance also requires that the ski conventionally be provided with a "side cut". This simply means that the ski must have a change in width along its length, for example, being wider in the tip or shovel area than in the central or waist area, where the boot is placed. The ski may also be wider in the tail than in the central waist area. With a side cut, the ski will contact the surface at only its widest parts when the ski is placed on edge, until additional load is applied at the boot attachment area, whereupon a radius of curvature is achieved. This is what takes place when one is "carving a turn".

Another design factor is that maximum bending moments, and hence stresses, are achieved when uneven terrain causes the skier to be supported at only the ends of the ski. This has previously been accommodated by increasing the thickness of the ski progressively from each end towards a maximum thickness in the middle of the ski. Material selection and fiber angles (in the case of composite construction) can also play a role in compensating for these high-stress conditions.

Hard skiing surfaces sometimes initiate unwanted vibrations. These vibrations are currently diminished by high-loss materials distributed about the construction of the ski. "High-loss materials" are materials which dissipate a portion of the vibration energy viscously such that the small amount of heat generated damps out the vibration.

In the case where the ski is expected to perform by making very rapid turns, lateral moments of inertia on the ski, known as "swingweights", must be minimized. This is currently aided by reducing the thickness of the ski away from the middle region and by the use of low-density materials, including composites.

It is desirable for skis to follow the terrain as closely as possible, thus requiring a relatively small lengthwise bending rigidity. The degree of bending rigidity which a ski possesses is sometimes discussed in terms of "flex". The greater the flex in the ski, the smaller the lengthwise bending rigidity. When fully loaded, almost the entire length of the ski or snowboard contributes to carving a turn. However, predominant rudder effect is exerted by the tip of the ski or snowboard. This requires a relatively large torsional rigidity, i.e, a higher resistance to twisting, such that rotation of the ski about its longitudinal axis is equivalent at the boot, the tip and the tail when initiating a turn, so that the ski nearly approximates a rigid body. If a ski is too soft in torsional rigidity, then a turn initiating lateral rotation of the ski at the boot will result in a smaller rotation at the tip. Hence, torsional softness results in much larger turn radii for a given side cut, when the ski is turned on edge. The result is a ski which makes "sluggish" turns.

If the ski has an insufficient load at its tip or if vibrations cause the tip to lose contact with the surface, then inadequate ski turn control is experienced. A small initial camber (0.2"–0.75", for example) assists in providing some lengthwise load distribution, and hence tip load (1-lb. to 6-lb., for example) upon flattening the ski.

Prevailing advice using current ski designs and manufacturing processes would have high-speed skiers use relatively higher bending rigidities (less flex) and vice versa. This allows for more accurate and responsive turning, at the expense of the ski's ability to follow the terrain, given that higher torsional rigidity always follows higher lengthwise bending rigidity, using conventional ski designs. The height and weight of skiers has traditionally dictated the length of the ski required, for all of the reasons described above.

Given the multitude of different lengths, side cuts, camber and torsional rigidities required, batch manufacturing of Alpine skis, cross-country skis, snowboards and the like, using closed molds or similar methods, is unreasonably expensive. It is therefore an object of the present invention, contrary to conventional designs and methods, to provide a device and method whereby lengthwise bending rigidities can be reduced (i.e., increased flex), and torsional rigidities can be increased simultaneously by non-conventional continuous ski manufacturing methods and designs. It is a further object to provide numerous intermediate step changes in the torsional stiffness of the device, so that any ski length can be provided, by a continuous manufacturing process which utilizes a single tooling cavity to form the ski. A different set of tooling for each size ski is not required. It is a still further object to provide a device and method whereby increased tip and tail loads, and hence load distribution and turn control, may be easily achieved with skis having a much lower lengthwise bending rigidity, contrary to conventional ski designs.

Others have sought to depart from conventional ski designs and manufacturing methods. U.S. Pat. No. 5,299,822 to Mayr et al. discloses a shell ski formed by a plurality of U sections connected to a plate-shaped part with connecting sections. The adjacent U sections form hollow spaces. A cover plate is secured to the top of the ski. A front shovel and a tail having lugs are attached to the ski by inserting the lugs into the ski body. The U sections may be formed by pultrusion.

U.S. Pat. No. 5,249,819 to Mayr discloses a ski having a hollow ski body. The ski body may have the same width over the entire length of the ski, and it is possible to use a core of extruded profiles which are continuously produced and cut to the length of the ski.

U.S. Pat. No. 3,933,362 to Sakuma et al. and U.S. Pat. No. 3,940,157 to Sakuma disclose ski structures having a hollow core. U.S. Pat. No. 5,265,911 to Goode discloses a pultruded, hollow ski pole. The pole may be comprised of different layers having fibers arranged in a crisscross or dual opposed lattice to provide greater strength. U.S. Pat. No. 5,294,151 to Goode discloses another hollow pultruded ski pole.

Finally, U.S. Pat. No. 5,366,773 to Schroll et al. discloses a method of making pultruded members. One example of these pultruded members has a rectilinear cross section.

None of the patents identified above discloses the specific design or manufacturing method for producing a hollow ski by a continuous manufacturing process, which method or design produces all of the advantages set forth in the objects discussed above.

SUMMARY OF THE INVENTION

The invention includes a torsion box having a body with a constant height and width throughout its length. The body defines a hollow interior with a first open end and a second open end, and the body is formed by a plurality of plies and a matrix. The plies are stacked in a materially imbalanced arrangement, and at least some of the plies consist of fibers which are disposed at an angle with respect to the longitudinal axis of the body. Preferably, a majority of the plies have fibers angled between 0° and +45°.

The torsion box preferably has a rectangular cross section that includes a camber. The plies may include fibers consisting of glass, carbon or Kevlar®. The matrix is preferably a thermosetting elastomeric resin. A tip component and a tail component may be inserted in the torsion box to form a ski. A first volume fraction of the torsion box may have a coefficient of thermal expansion which is different than that for a second volume fraction of the torsion box. Most preferably, an upper half of the torsion box includes a two-ply layer containing Kevlar® fibers at +30° and −30° with respect to the longitudinal axis of the torsion box. This two-ply Kevlar® layer is absent from the lower half of the torsion box, thus creating the material imbalance and the difference in expansion coefficients.

The invention also includes a ski having a tip, a tail and a waist area. The ski is made of a pultruded torsion box formed by a plurality of plies and a matrix. The plies are stacked in a materially imbalanced arrangement. A majority of the plies have fibers disposed at an angle with respect to the longitudinal axis of the ski. A base is applied to a lower surface of the torsion box, and a top cover is applied to the top surface of the torsion box. Steel edging, a tip component and a tail component are secured to the torsion box to complete the ski.

The ski may have glass fiber plies in the torsion box, with the plies having fibers oriented between ±45° and ±60° with respect to the longitudinal axis of the ski. The ski may also have at least two Kevlar® plies, with the Kevlar® plies having fibers oriented between 0° and ±45° with respect to the longitudinal axis of the ski.

As an alternative to Kevlar®, the ski may have at least two carbon plies, the carbon plies having fibers between 0° and ±30° with respect to the longitudinal axis of the ski.

The ski may have a saw cut in a lower portion of the torsion box, located between the waist and the tip of the ski. The saw cut reduces torsional rigidity. The torsion box is preferably of a rectangular cross section. The ski preferably has a lengthwise bending rigidity in the range of about 10 N-m$^2$ to about 150 N-m$^2$. The camber of the ski is in the range of about 1 cm to about 30 cm.

Finally, the invention includes a process for making a pultruded product having a constant cross section and a camber upon cooldown. The process includes the steps of supplying a resin bath, a heated die, a pulling mechanism and a cutoff mechanism downstream of a supply of fibers. The fibers are pulled first through the resin bath and then through the heated die to form the pultruded product. A majority of the fibers are angled with respect to the longitudinal axis of the product. The product is cut to a desired length. Importantly, the composition, arrangement and amount of the fibers are controlled so that, upon cooldown, the product exhibits a predetermined camber.

The preferred method for inducing a camber in the product is to arrange the fibers so that the product is materially imbalanced about its mid-thickness. This imparts different aggregate expansion coefficients for a first volume fraction and a second volume fraction of the product. Upon cooldown, the first and second volume fractions of the product contract at different rates, thus inducing the camber.

The method may further include the step of inserting a saw cut in the product to reduce its torsional rigidity. The wet resin bath is preferably comprised of a thermosetting elastomeric resin.

The steps of supplying a resin bath and pulling fibers through the bath may be replaced by a step of injecting resin directly into the die to impregnate the fibers with resin.

DETAILED DESCRIPTION OF THE PREFERRED EMBODIMENTS

Figure 1:
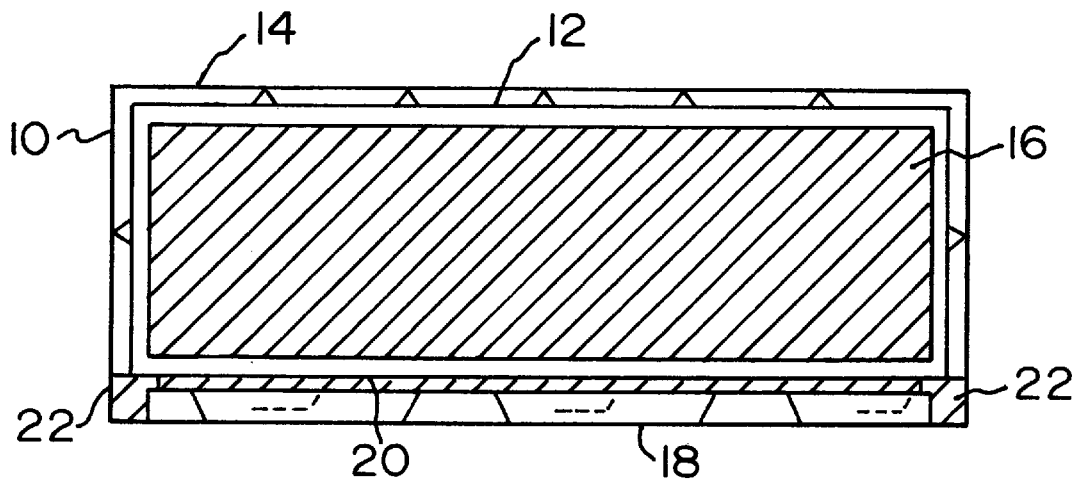
FIG. 1 is a cross-sectional view showing the core of a ski according to the prior art.

FIG. 1 shows the core of a ski which is designed and manufactured according to the prior art. Ski 10 has a torsion box 12 which is generally made of a fabric of glass or other fibers. The torsion box 12 gives the ski resistance to force through a continuous weave of uninterrupted, full-length fibers. Because the fibers run diagonally as well as lengthwise, they provide an element of torsional strength and stiffness for any given level of longitudinal flex. The torsional stiffness of the ski is controlled by adjusting the ply angle and selection of fiber type. Plies are placed at an angle of 30°, with respect to the longitudinal axis of the ski, for example, to provide a torsionally soft, forgiving ski, while a ply angle of 45° is desirable for expert-level skis having higher torsional rigidity.

The torsion box is covered by a top cover 14 which is made of a polymer and is lightweight but durable for protecting the fiberglass torsion box 12. The top cover can be made of a blend of ABS and polyurethane. The torsion box 12 may be provided with a wood core 16.

Base 18 allows the ski to glide on a wide range of snow conditions. It has high abrasion resistance and is usually made of polyethylene. Sometimes graphite is incorporated in base 18, to provide lubrication and to help discharge static electricity generated by friction on dry snow.

In a typical construction, a layer of glass fibers, angled with respect to the ski's longitudinal axis, in combination with carbon or Kevlar® fibers oriented parallel to the longitudinal axis, is positioned at 20, between the base 18 and the torsion box 12. Finally, steel edges 22 are positioned on the lower peripheral edges of ski 10.

Figure 2:
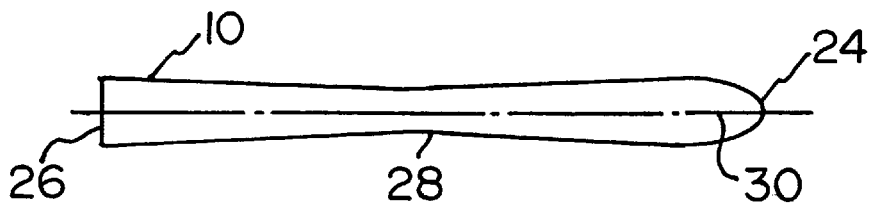
FIG. 2 is a plan view of a ski according to the prior art.

Referring to FIG. 2, the ski 10 has a tip 24 and a tail 26 with a waist 28. A binding (not shown) and the skier's boot are typically located in the area of the waist 28. As shown in FIG. 2, the width of the ski (and the torsion box) typically increases as one progresses from the waist 28 towards the tip 24 and tail 26, along longitudinal axis 30. This changing width defines a side cut, which is the curve that runs from the tip 24 to the tail 26 of ski 10. The side cut determines how a ski turns. When a ski is put on edge, it follows a radius defined by the rotated side cut. For example, a giant slalom ski that makes a few gradual turns at high speed will have a smaller side cut than a slalom ski, which requires tighter turns.

Camber is the arc that is built into the ski's profile from tip 24 to tail 26. An example of departure from horizontal created by the camber is indicated by line 25 in FIG. 4. The camber would be visible from the side when the ski is placed horizontally on a flat surface. The camber helps distribute the skier's weight and provides a pressure load at the tip 24 and tail 26 of the ski to give it a spring action.

Ski performance is affected not only by the shape of the ski, but also by its mechanical behavior. Important ski properties are torsional rigidity, flexure, and swingweight. Torsional rigidity is a property which determines how stiff a ski is when twisted along longitudinal axis 30. The torsional rigidity is partly responsible for how well a ski turns. Expert skis have traditionally been stiffer, i.e., possessing greater torsional rigidity, than beginner skis.

Flexure describes the curvature which results from vertical forces applied to the tip and the tail of the ski. Flexure is dependent on the thickness of the materials used in the ski construction in addition to material moduli.

Swingweight basically refers to the amount of ski weight which is distributed toward the tip and tail of the ski. The greater the weight, the greater the lateral moment of inertia of the ski when rotated about a vertical axis. For quick-turning capability, the swingweight, and hence lateral moments of inertia, should be kept to a minimum.

Figure 4:
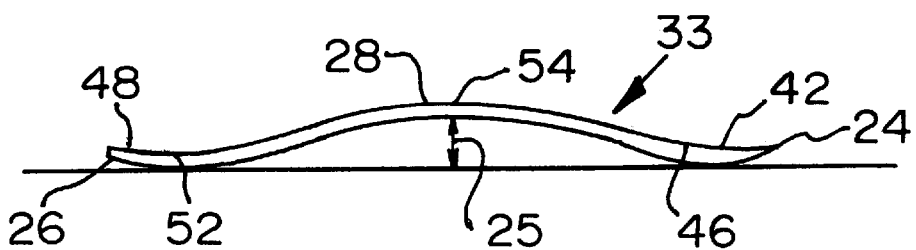
FIG. 4 is a side view of a completed ski, according to the present invention.
Figure 3:
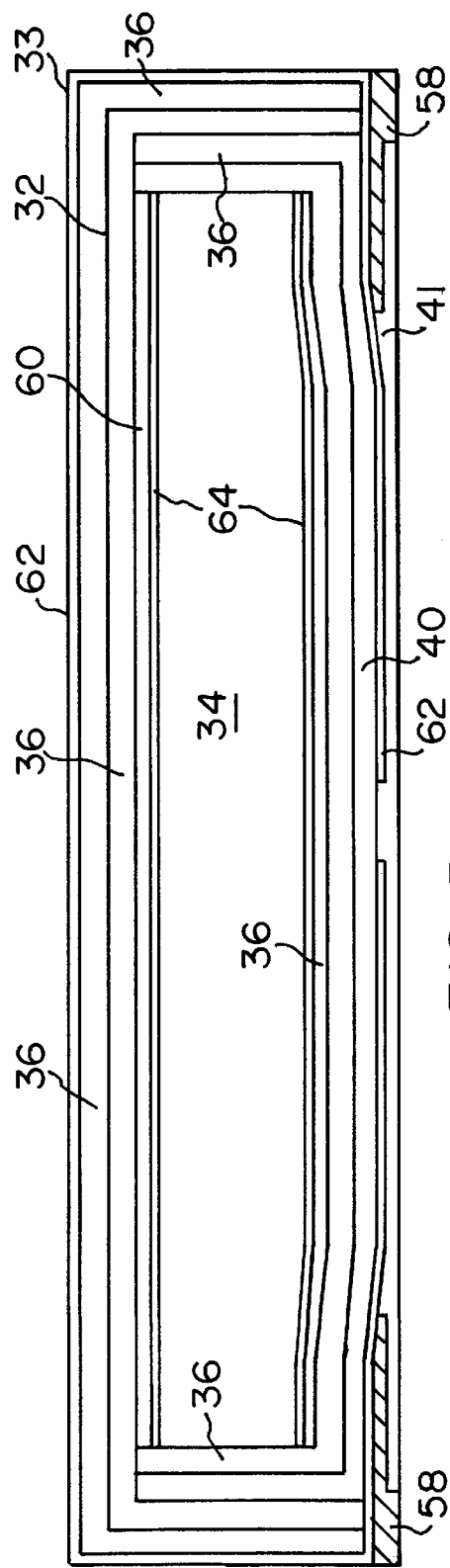
FIG. 3 is a cross-sectional view showing a design for a pultruded ski core, according to the present invention.

With those basics in mind, we now turn to a description of the improved ski design and manufacturing process of the present invention. The present invention provides a ski design and manufacturing process for making the ski, whereby a prismatic, i.e., constant cross section, ski or snowboard is manufactured by a pultrusion process, using advanced continuous filament composite materials and controlled thermal distortion. Referring to FIGS. 3 and 4, the torsion box 32 in the ski 33 according to the present invention constitutes the bulk of the ski length and thickness. The torsion box 32 has a constant thickness and width and is coterminous with ski body 54, shown in FIG. 4. The torsion box 32 defines a hollow interior 34, and the torsion box is formed from a plurality of bias ply fibers 36. The bias ply fibers are laid up in a particular manner, with a particular angulation with respect to the longitudinal axis of the torsion box, so that the torsion box mechanically approximates a non-tapering beam. Thereby, the torsion box may be configured to provide up to five times the torsional stiffness found in conventional skis using carbon fiber at ±45°, for example. The particular layup and angulation of the bias ply fibers, as well as their composition, is discussed in further detail below.

Figure 8:
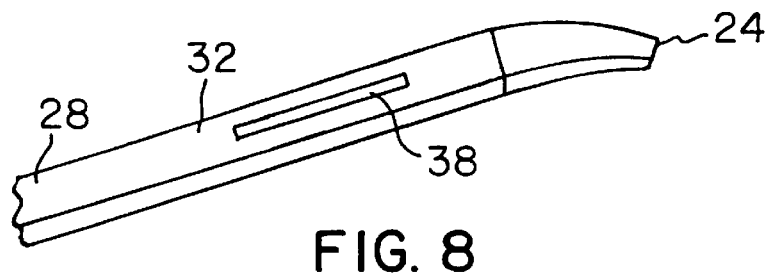
FIG. 8 is a perspective view showing a lengthwise saw cut in the base of a pultruded ski core, according to the present invention.

Given the high torsional rigidity bestowed by the torsion box 32, it may in some cases be desirable to reduce the torsional rigidity of the torsion box. This can be accomplished by inserting a saw cut 38 in the torsion box 32, as shown in FIG. 8. Preferably, the saw cut 38 is located in the bottom 40 of the torsion box 32, and is located between the waist 28 and the tip 24 of the ski. The saw cut 38 extends lengthwise, parallel to the ski's longitudinal axis. Importantly, the saw cut 38 is placed in the torsion box 32 before application of any base material 41 to the torsion box 32. Further, the saw cut 38 should not extend to the open end of the torsion box 32. The length of the saw cut will determine the reduction in torsional rigidity for the ski 33. For example, a 2-inch saw cut has been found to reduce the torsional rigidity of the torsion box 32 by almost two orders of magnitude when placed close to the mid-length. In this manner, the saw cut 38 acts as a "virtual hinge" whose position and length may be varied to achieve the desired torsional rigidity. Beginner skis may be provided with a saw cut close to the middle to greatly reduce torsional rigidity, while expert skis may be provided with a saw cut close to the tip to reduce torsional rigidity by a lesser degree. Maximum torsional rigidity is, of course, obtained without any saw cut being incorporated.

The prismatic construction of the torsion box enables a smaller thickness of the torsion box to be used to achieve a given torsional rigidity. Particularly, lengthwise bending rigidity can be reduced by 80% compared to skis made according to conventional designs and processes, for a given degree of torsional rigidity. The torsion box 32 is also comprised of a matrix material, such as an elastomeric resin or an epoxy. Urethane elastomer has been found suitable. Elastomeric resin matrix materials are preferable to rigid matrix materials, when using the pultrusion process according to the present invention. Particularly, a 185 cm. ski made according to the pultrusion process, using a rigid matrix material and incorporating a particular layup exhibited bending failure at a tip deflection in excess of 37 inches. By contrast, when an elastomeric resin matrix was used with the pultrusion process, a margin of safety of 2 remained at this same deflection. Thus, skis made according to the present invention will fail only under extreme and unusual abuse.

Figure 9:
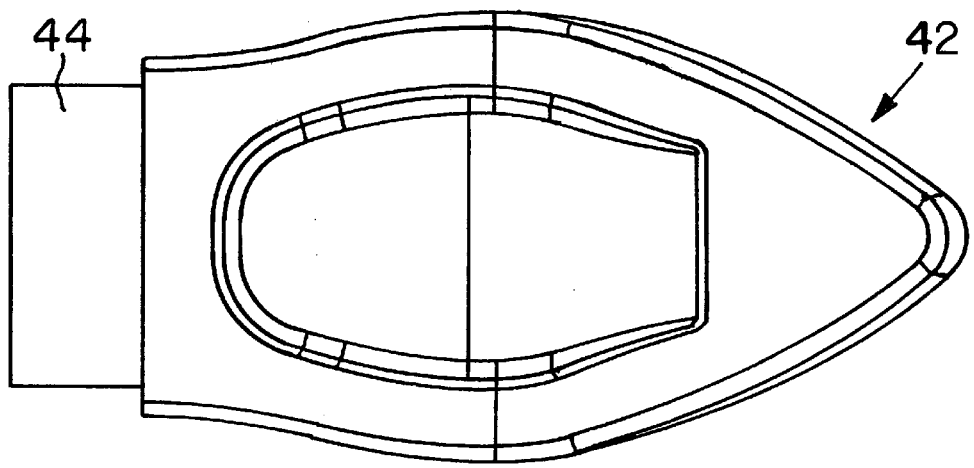
FIG. 9 is a plan view of a ski tip component according to the present invention.
Figure 10:
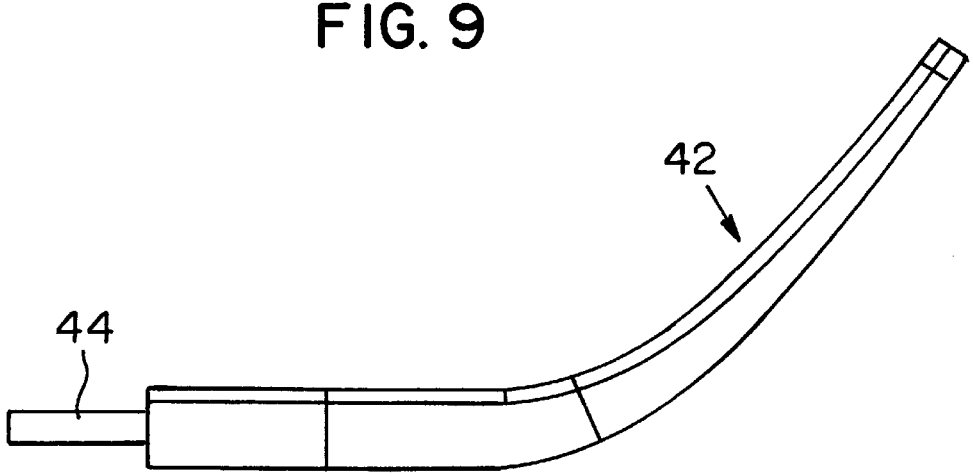
FIG. 10 is a side view of the ski tip component of FIG. 9.
Figure 11:
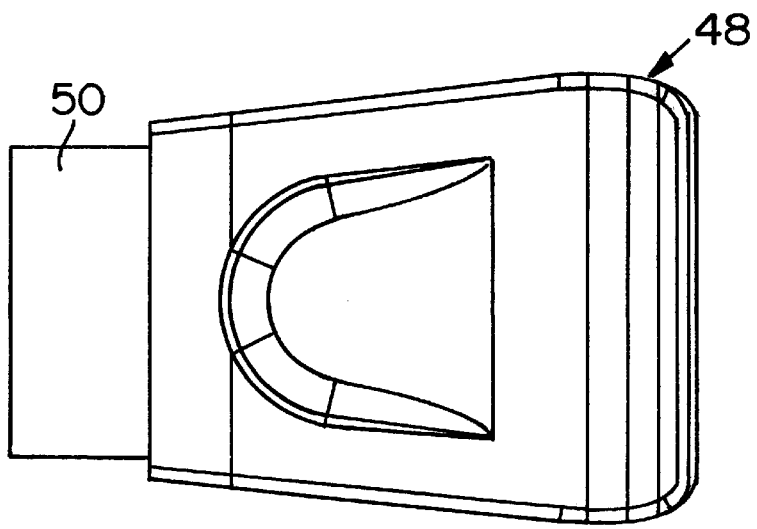
FIG. 11 is a plan view of a ski tail component according to the present invention.
Figure 12:
FIG. 12 is a side view of the ski tail component of FIG. 11.

The versatility of the design and manufacturing process according to the present invention is enhanced by the use of sculpted tip and tail components, as shown in FIGS. 9–12. Referring to FIG. 9, a sculpted tip component 42 carries a lug 44 which is inserted and bonded in a first end 46 of the torsion box 32. Likewise, in FIG. 11, a sculpted tail component 48 is shown, carrying a lug 50. Lug 50 is inserted in a second end 52 of the torsion box 32. A completed ski 33, with the tip component 42 and the tail component 48 inserted and bonded in the torsion box 32, is shown in FIG.

4. Tip and tail components may be injection molded using either thermoplastic or thermoset materials. They may also be produced by spin casting and preferably exhibit a resilience typical of unreinforced thermoplastic elastomers or cast urethane elastomers. Adhesive bonding techniques, to secure the tip and tail to the torsion box, will vary according to the selected surface energy but will typically employ a solvent cleaning, light abrasion, and either an epoxy, acrylic or urethane adhesive chemistry.

The tip component 42 and tail component 48 vary in width and thickness along their length so that they introduce a gradual increase in the width of the overall ski, compared with the pultruded body 54 of the ski. Thus, a range of fully effective side cuts can be introduced to the ski without additional primary tooling, and all desirable turn radii may be achieved. The primary tooling need only produce a continuous prismatic beam such that different ski lengths are achieved by simply cutting the pultruded torsion box as desired. Studies have shown that providing a side cut over the entire length of the ski, as opposed to introducing it discretely at the ends of the ski as in our invention, makes little difference in the shape of the resulting turn.

Referring back to FIG. 3, the torsion box 32 is provided on its lower portion 40 with a base 41 and steel edging 58. The base preferably is made from sintered or extruded polyethylene material. A top cover, a base and edging may be applied after the torsion box 32, tail component 48 and tip component 42 are assembled. Alternatively, cover, base material and edging may be applied individually to the separate tail and tip components and the torsion box 32, prior to final assembly of these components. External dimensions of tip and tail components are such as to provide a flush, continuous running surface after the addition of polyethylene base material and steel edging. Adhesion of base material and steel edging will ideally be via the same adhesive as used to install the tip and tail. Final adhesive choice also depends on selected surface energies and is preferably carried out at the same time as tip and tail are installed.

Finally, a layer 60 is located in the upper portion of hollow interior 34 of torsion box 32. This layer 60 may contain carbon or Kevlar® fiber which is laid up in a manner such that the physical properties of the torsion box are not symmetric about the mid-thickness. This asymmetry or unbalance may employ fibers parallel to the longitudinal axis or at some angle suitable for achieving desired modulii and expansion coefficients.

A process of controlled thermal distortion is utilized to predict and achieve a desired camber on the ski, according to the present invention. The camber is induced using a purposely unbalanced ply stacking sequence for torsion box 32. The elastomeric resin matrix, which encompasses and encapsulates bias ply fibers 36 and carbon or Kevlar® fibers 60 at some other angle, locks onto these fiber plies at the elevated processing temperatures experienced in a pultrusion die, for example, 325° F. When the pultruded torsion box is cooled, a circular curvature along the length of the torsion box, of predetermined magnitude, is manifested. This comprises the camber of the ski. It has been found that, using greater camber than is found in conventional ski designs, in combination with lower lengthwise rigidity, an enhanced load distribution along the ski is achieved such that there is a higher load at the tip. Additionally, the elastomeric matrix composite provides approximately double the strain to failure in ski bending, obviating the need for greater thickness at the mid length, as has been used conventionally.

The process for making the ski according to the present invention generally has the following variables:
1. Fiber modulus and matrix resin modulus;
2. The angle at which the fiber plies are laid up or wound on a mandrel with respect to the longitudinal axis of the torsion box;
3. Fiber composition;
4. Wall thickness;
5. Envelope geometry;
6. Expansion coefficients for the materials utilized; and
7. Processing temperature.

According to the invention, the above variables may be adjusted so as to provide a desired lengthwise bending rigidity, torsional rigidity, camber, tip load when flattened, bending radius of curvature at failure, and manufacturing economics for a given ski.

A preferable ski design according to the present invention utilizes Kevlar®, carbon, and glass fibers or some combination, disposed about the longitudinal axis of the torsion box in a predetermined manner, the fibers being embedded in an epoxy (rigid) matrix or, more preferably, in a urethane elastomer matrix.

A preferred layup schematic for a torsion box according to the present invention is as follows. Beginning with the top cover or veil 62, shown in FIG. 3, this element is almost completely wrapped around all four sides of the torsion box 32 and has minimal weight. The width of the veil 62 may be about 5.5 inches (140 mm), and the thickness about 0.23 mm.

Moving downward along the vertical axis of the torsion box through the thickness of the box, the next layer is the uppermost glass fiber layer 36, having fibers disposed at ±45° with respect to the longitudinal axis of the torsion box. The weight of this layer is 48 oz./yd.$^2$, and its width is about 3.5 inches (89 mm) while the thickness is about 1.14 mm. This layer extends only over the top and side portions of the torsion box 32.

Moving downward, the next layer is similar to that directly above it, but narrower. This layer also has fibers oriented at ±45° with respect to the longitudinal axis of the torsion box, and its weight is also 48 oz./yd.$^2$. The width is 3.3 inches (84.3 mm), and the thickness is again 1.14 mm. As with the layer above it, this layer extends across the top and sides only of the torsion box.

The next layer 60 may be a carbon layer with fibers extending parallel to the longitudinal axis, i.e., 0°. The weight of this ply is 13 oz./yd.$^2$, and the width is 2.2 inches (56.1 mm). The thickness is about 0.55 mm. This layer extends only horizontally along the top of torsion box 32, thus creating an unbalanced ply stacking sequence. More preferably, this layer may be replaced with a Kevlar® layer of similar dimensions, the Kevlar® having fibers extending at ±30° with respect to the longitudinal axis of the torsion box. Layer 60 creates a material imbalance in the torsion box 32 about its mid-thickness, since there is no corresponding layer made of the same material in the lower half of the torsion box. It is this material imbalance that, upon cooldown, creates the camber in the torsion box.

Directly beneath the carbon or Kevlar® layer 60 is an inner veil layer 64, similar to top cover 62, the width being similar to the Kevlar® or carbon layer 60, i.e., 2.2 inches (56.1 mm). A preferred thickness is 0.127 mm, and the weight is also minimal.

Moving downward across hollow interior 34, the next layer seen is another inner veil 64. This inner veil is identical to the inner veil above.

The next layer, proceeding downward, is another glass layer 36 which extends only the width of the hollow interior 34. This layer has fibers extending at ±45° with respect to the longitudinal axis of the torsion box, the weight is 24 oz./yd.$^2$ and the width is 2.2 inches (56 mm). The thickness is 0.5734 mm.

Further down, another, wider glass fiber layer is positioned, again having fibers extending at ±45° with respect to the longitudinal axis of the torsion box. The weight of this layer is 48 oz./yd.$^2$, and its width is about 2.9 inches (75.75 mm). This layer extends across the lower portion and side portions of the torsion box and has a thickness of about 1.14 mm.

Finally, the lowermost glass fiber layer is positioned, again having fibers at ±45°. The weight is 48 oz./yd.$^2$, and the width is about 3.1 inches (79.8 mm). This lowermost glass fiber layer extends across the bottom and upward along the sides of the torsion box 32 and has a thickness of 1.14 mm.

Numerical experiments were conducted whereby the matrix material, the length of the torsion box, and the composition and fiber angle of the various lamina were varied.

First, the layup schematic discussed above was utilized, and the length of the torsion box was varied. Additional analyses were made utilizing urethane elastomer matrix material instead of epoxy matrix material. The results for characteristics achieved with this design are set forth in Table I, below.

TABLE I

| Matrix | EPOXY | | | URETHANE ELASTOMER |
|---|---|---|---|---|
| True Length (cm) | 160 | 185 | 210 | 185 |
| F. E. A. Length (Constant CSA) | 135 | 160 | 185 | 160 |
| Camber (cm) | 2.94 | 4.13 | 5.52 | 36 |
| Lengthwise Rigidity (N-m$^2$) | 111 | 111 | 111 | 20 |
| Tip Load (N) | 27.35 | 24 | 20.77 | 42.3 |
| (lb.) | (6.14) | (5.4) | (4.66) | (9.5) |
| Maximum Deflection (cm) | 70 | 94 | 121 | 210 |
| | 27.6" | 37" | 47.6" | 83" |
| Weight (Kg) | 1.24 | 1.47 | 1.7 | 1.47 |

From the results in Table I, it can be deduced that utilizing skis according to the layup schematic above, it should be easier for a child to ski, because the smaller the ski is, the bigger the tip load. In other words, the smaller the ski is, the more reliable the 'rudder action'. The runs whose results are set forth in Table I were conducted utilizing a Kevlar® material for layer 60, with fibers oriented at ±30° with respect to the longitudinal axis of the torsion box.

Next, the same parameters were used, except that the Kevlar® ply 60 was replaced with a ply having a carbon composition with fibers oriented at 0°, i.e., parallel to the longitudinal axis. Additionally, this run utilized a urethane elastomer resin matrix. The results achieved are set forth in Table II, below.

TABLE II

| Matrix | URETHANE ELASTOMER |
|---|---|
| Camber (cm) | 12.6 |
| Lengthwise Rigidity (N-m$^2$) | 23.31 |
| Tip Load (lb.) | 5.53 |

TABLE II-continued

| Matrix | URETHANE ELASTOMER |
|---|---|
| weight (lb.) | 1.47 |
| Length (cm) (Constant CSA) | 160 |

Finally, the sample utilized in Table II was again run, except that some of the glass plies, whose fibers were initially oriented at ±45°, were replaced with certain plies having fibers oriented at 0°, i.e., parallel to the longitudinal axis. The results are set forth in Table III, below.

TABLE III

| Matrix | URETHANE ELASTOMER |
|---|---|
| Camber (cm) | 15.3 |
| Lengthwise Rigidity (N-m$^2$) | 81.84 |
| Tip Load (lb.) | 23.56 |
| Weight (lb.) | 1.47 |
| Length (cm) (Constant CSA) | 160 |

As a means of comparison, 14 high-quality, conventional Alpine skis, with lengths from 185 cm to 207 cm, were evaluated for the properties in the tables above. For the conventional skis, moderately high torsional rigidities were apparent, at the price of an average lengthwise rigidity of 147 N-m$^2$ and a standard deviation of 35.7 N-m$^2$. Tip loads for these skis ranged from 2–6 lbs. As compared to the conventional skis, the skis configured according to the present invention exhibited increased, or at least equal, values of torsional rigidity compared to the conventional skis when bias ply glass was used, while at the same time providing a much-reduced lengthwise bending rigidity (i.e., greater flex) and a higher tip load. If the bias ply glass was replaced with bias ply carbon fibers, then the differences would become greater still.

Prototype production of a 185 cm ski with epoxy matrix resin and utilizing the first layup described produced results essentially identical to the tabulated numerical predictions.

Figure 6:
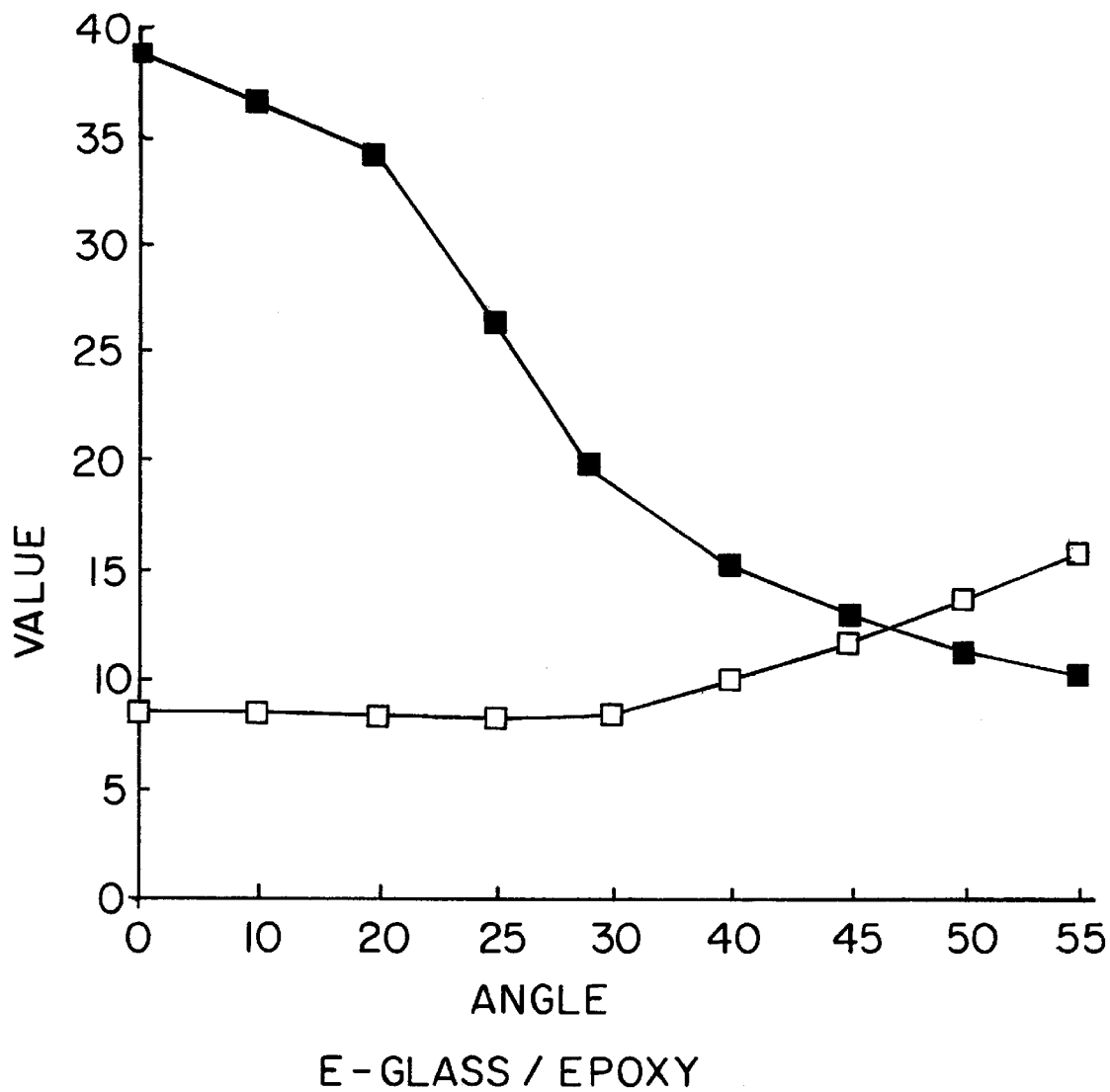
FIG. 6 is a graph showing the variation in both material extensional modulus and expansion coefficient versus the layup angle for E-glass fibers, utilized in construction of skis according to the present invention.
Figure 7:
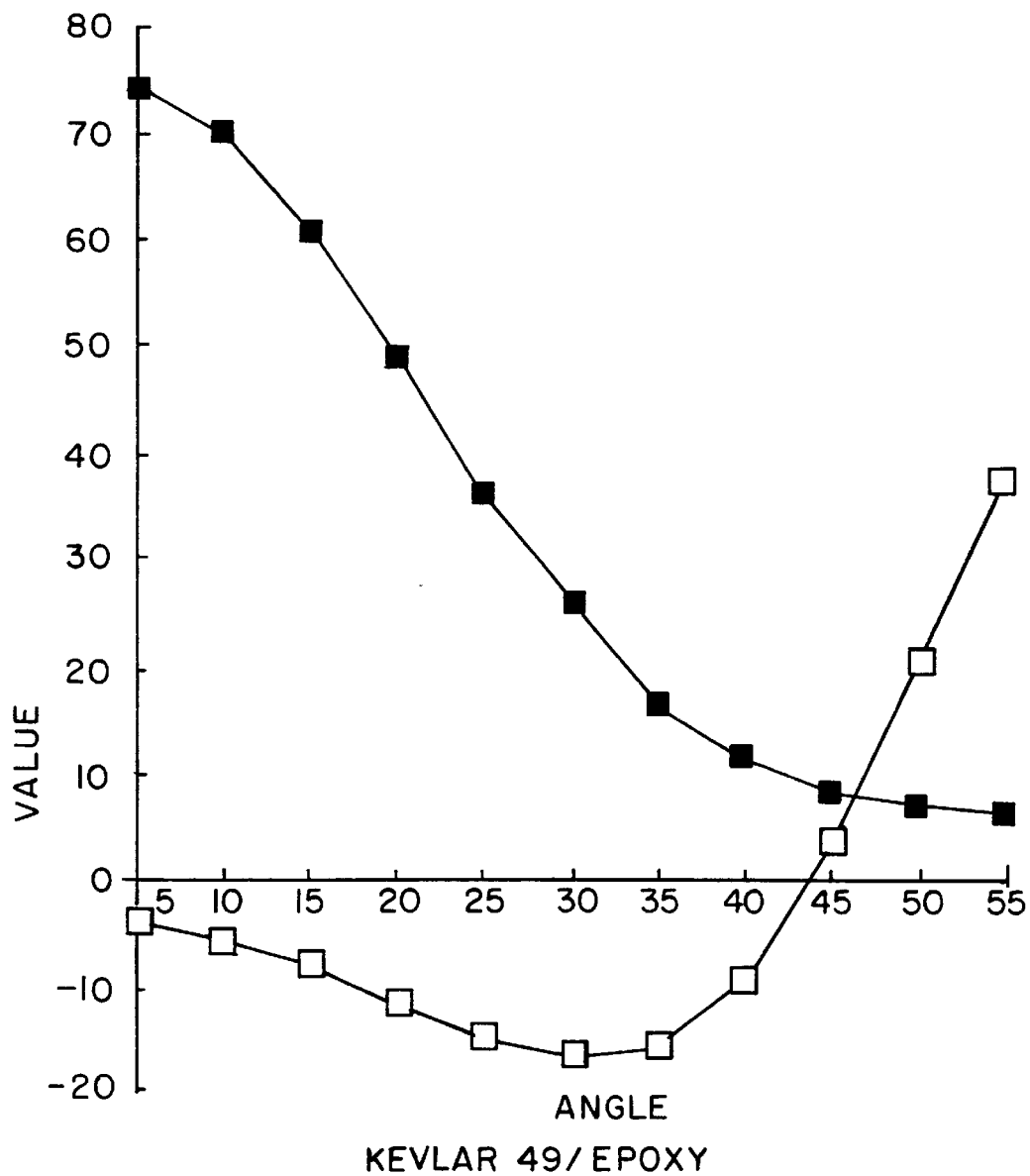
FIG. 7 is a graph showing the variation in both material extensional modulus and expansion coefficient versus layup angle for Kevlar® fibers, utilized in skis according to the present invention.
Figure 13:
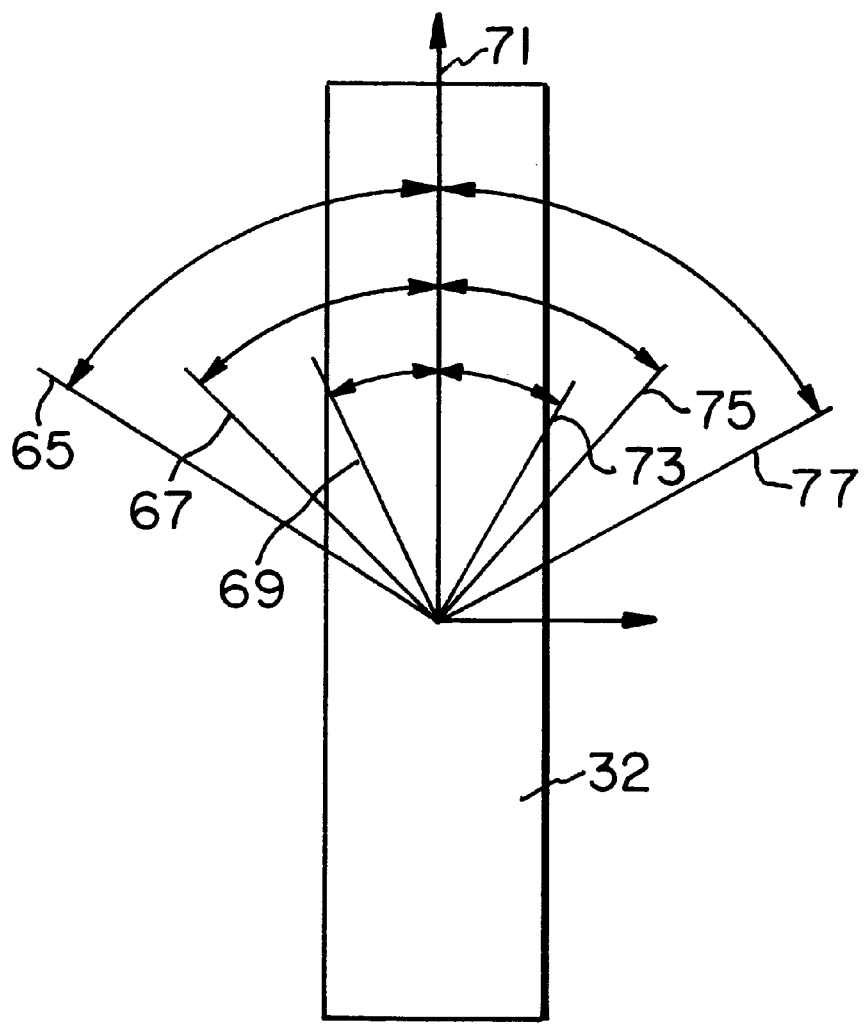
FIG. 13 is a schematic showing various fiber layup angles according to the present invention.

In order to determine the best fiber angles for use with skis according to the present invention, studies were conducted measuring the modulus and coefficient of thermal expansion in the horizontal plane for both glass fiber bias plies and Kevlar® bias plies. The results are shown graphically in FIGS. 6 and 7. In each Figure, the symbol "■" represents the values of the modulus for the bias ply measured versus fiber angle, in GPa. The symbol "□" denotes a value of the coefficient of thermal expansion in the horizontal plane for the ply (×10$^{-6}$/° C.). Plan views of 60°, 45°, 30° and 0° fiber angles, as used in the plies which make up the torsion box of the present invention, are shown in FIG. 13. Line 65 shows an angle of 60°. Line 67 shows an angle of 45°, line 69 shows 30°, and line 71 shows 0°. Line 73 shows −30°, line 75 shows −45°, and line 77 shows −60°.

For glass fibers, angles ranging from 0 to 55° in absolute value with respect to the longitudinal axis of the torsion box are shown. The same range is shown for Kevlar®.

To achieve maximum camber, the difference in the aggregate expansion coefficient for a first volume fraction of the torsion box, i.e., the upper half, and a second volume fraction of the torsion box, i.e., the lower half, should be at its greatest. Referring to FIG. 3, "upper half of the torsion box" refers to the top four bias ply layers, extending from top cover 62 to inner veil 64. The phrase "lower half of the torsion box" refers to the lower inner veil 64 extending down to the lower end of top cover 62.

Each of the discrete layers 36 and 60, shown in FIG. 3, is a combination of two plies having the fibers oriented in opposing angles with respect to the longitudinal axis. For example, the uppermost layer 36 in FIG. 3 comprises two glass fiber plies, one with its fibers at −45° with respect to the longitudinal axis of the torsion box and one with its fibers at +45° with respect to the longitudinal axis of the torsion box. The remainder of the constitution for the layer would be the matrix material. The same is true for the remaining layers 36 and the layer 60. Kevlar® and carbon fibers are particularly useful since they have a negative expansion coefficient over a certain range of angles, and this enables induicement of a camber on the torsion box when the torsion box cools down after molding.

As a result of testing skis currently on the market, the following design criteria for skis according to the present invention was determined:

1. The weight of one ski should be in the region of 1.6 kg;
2. The lengthwise bending rigidity of the total ski should be less than 150 N-m$^2$;
3. The tip load when the ski is flattened should be close to 3.5 kg (35 N); and
4. The ski should have a torsion box with relatively high torsional rigidity, developed from the non-tapering prismatic beam.

Through testing, we have determined that the preferred angle of the fabrics in layers 36 is an alternating sequence of +45° and −45°, and the preferred angulation of fibers in layer 60, using Kevlar®, is an alternating two layers of +30° and −30°. This layup gave the following results for a 185 cm ski:

1. Camber=4.13 cm (1.63 inches);
2. Lengthwise rigidity=111 N-m$^2$; and
3. Tip load=24 N (5.4 lbs.).

Such a ski having these properties will endure even the greatest of stresses incurred in normal skiing and will have good performance. The fiber volume fraction in each of layers 36 and 60 is preferably between 50 and 60%. The rest of the volume would comprise the matrix material, either epoxy or, more preferably, an elastomeric resin.

Figure 5:
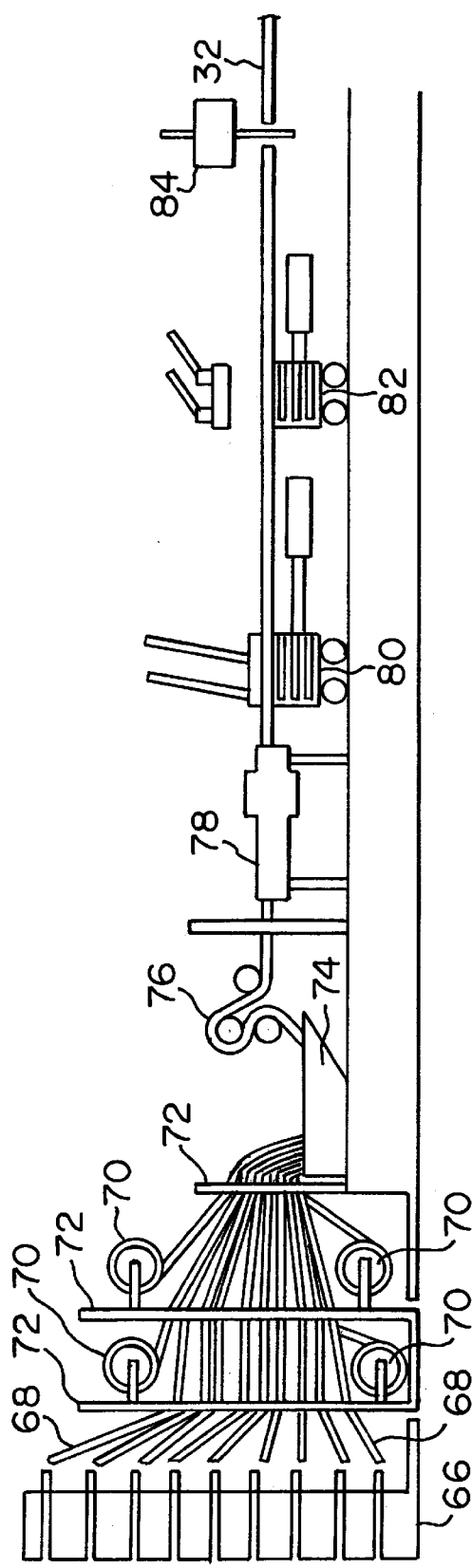
FIG. 5 is a schematic view of a continuous manufacturing process for pultruded skis and the like, according to the present invention.

Referring to FIG. 5, a schematic of a pultrusion process for making the skis according to the present invention, is shown. It should be noted that the process as shown in FIG. 5 is meant to be only exemplary, and various other arrangements of similar devices and process steps will be apparent to those of ordinary skill in the art for accomplishing the objects of the present invention. Beginning at the left of the process line, fiber racks 66 provide storage and easy removability of the various fibers 68 which constitute the torsion box made according to the present invention. Cloth racks 70 may be disposed down line from the fiber racks 66, and various pre-forming guides 72 are used to properly space and orient the fibers and the cloth, prior to their introduction to a wet resin bath 74. After being impregnated with the resin, the cloth and fibers continue through forming guides 76, and from there they enter a heated die 78 where curing takes place.

Note that in a variation of the process according to the present invention, the resin bath 74 may be dispensed with and, instead, resin may be injected under pressure directly into the die 78 to impregnate or apply resin to the fibers.

The cloth and fiber is pulled through the resin bath and the die by pulling mechanisms. FIG. 5 shows a first pulling mechanism 80, which is engaged on the product, and a second pulling mechanism 82, which is disengaged from the product.

Finally, a moving cutoff saw 84 creates a torsion box 32 of a desired length.

The word "pultrusion" is derived from the fact that the cloth and fibers must be pulled through the resin and the die to form the desired shape. The resin should be of a low viscosity and is normally thermosetting. Pultrusion is a continuous process. With the automated cutoff saw 84, a pultrusion line, such as that shown in FIG. 5, can run with virtually no attention, except for occasional checking of the fiber supply and the resin level.

We have found that a preferable temperature for die 78 is 400° F.

Bias ply textiles slit to the widths described are arranged on the racks in combination with unidirectional rovings. Alternatively, circumferentially wound rovings could replace some or all of the bias ply material with similar final architecture.

It is desirable to use an internal mold release in connection with the resin, since the die 78 is continuously wiped by the moving composite. Typical mold releases include organic phosphates, lecithin or metallic stearates.

The resin bath 74 is typically 3–6 feet long and is as wide as necessary. Typical resin baths have bars between which the fibers and cloth pass. If multiple layers are required, the pairs of cloth and fiber should be kept separate through the bath and combined afterwards.

The die 78 is typically 3–5 feet long and made from alloy steel, heat treated to a high hardness and polished to as smooth a surface as possible. It is also typical to chrome plate these molds for added wear resistance. It is advantageous to design the mold 78 so that it can be turned on end after a certain amount of wear since the front end receives most of the wear. The front end of the die 78 (closest to the resin bath 74) is typically cooled to prevent gelling of the resin ahead of the die.

The most common type of puller 80 grips the pultruded part between two rubber-cleated chain drives with the gripping pressure between the chain drives maintained either mechanically or by hydraulic pressure cylinders. The usual chain length is 4 to 6 feet. Another type of puller is an intermittent back-and-forth vice clamp, which grips on the forward stroke and releases on the backward stroke. Two of the intermittent clamps may be combined to give a continuous motion. An advantage of the reciprocating clamp over the rubber-cleated caterpillar-type drive is its ability to handle thin-walled, complex shapes with undercuts, since the clamp slides over the part during the upstream stroke. A metal support block can be used inside the part, with the support block moving back and forth with the puller.

The automated or "flying" cutoff saw 84 uses either wet or dry silicon carbide grit or a diamond blade. The pultruded part must be clamped to the saw table 84 during cutting so that the cutting blade and the table will then move with the part, hence the term "flying".

Both types of puller will perform equally well in the case of the ski profile of the present invention. Resin injection is the preferred wet out technique for the present invention due to the undesirable affinity of the preferred urethane elastomer matrix for atmospheric moisture.

Having described the presently preferred embodiments of the invention, it will be understood by those skilled in the art that it is not intended to limit the invention except within the scope of the following claims. The torsion box and method of constructing a pultruded product according to the invention may be applied to devices other than skis, and it is not intended to limit the invention to skis.

What is claimed is:

1. A process for making a pultruded product having a constant cross section and a camber upon cooldown comprising the steps of:
   (a) supplying a resin bath, a heated die, a pulling mechanism and a cutoff mechanism downstream of a supply of fibers;
   (b) pulling said fibers first through said resin bath and then through said heated die to form said product, said product having a constant cross-sectional area, a majority of said fibers angled with respect to a longitudinal axis of said product;
   (c) cutting said product to a desired length; and
   (d) controlling the composition and amount of said fibers and arranging said fibers so that said product is materially imbalanced about its mid-thickness so as to impart different aggregate expansion coefficients for a first volume fraction of said product and a second volume fraction of said product, so that, upon cooldown, said product exhibits a predetermined camber.

2. The process of claim 1 wherein said wet resin bath is comprised of a thermosetting elastomeric resin.

3. The process of claim 19 wherein said steps of supplying a resin bath and pulling fibers through the bath are replaced by a step of injecting resin directly into said die to impregnate the fibers with resin.

* * * * *

UNITED STATES PATENT AND TRADEMARK OFFICE
CERTIFICATE OF CORRECTION

PATENT NO.  : 5,948,472
DATED       : September 7, 1999
INVENTOR(S) : Duncan J. Lawrie It is certified that error appears in the above-identified patent and that said Letters Patent is hereby corrected as shown below:

Column 2: Lines 47-48 "5,299" and "822" should read --5,299,822--.

Column 14 Line 11, claim 3, "of claim 19" should read --of claim 1--.

Signed and Sealed this

Eighteenth Day of April, 2000

Attest:

Q. TODD DICKINSON

Attesting Officer

Director of Patents and Trademarks